(12) United States Patent
Heath

(10) Patent No.: US 6,786,560 B2
(45) Date of Patent: Sep. 7, 2004

(54) INTEGRATED AIR DRYER MODULE FOR VEHICLE AIR BRAKE

(75) Inventor: Stephen P. Heath, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 5 days.

(21) Appl. No.: 10/271,188

(22) Filed: Oct. 15, 2002

(65) Prior Publication Data

US 2004/0070264 A1 Apr. 15, 2004

(51) Int. Cl.⁷ ............................................. B60T 17/00
(52) U.S. Cl. .................. 303/1; 137/899.4; 96/147; 303/85
(58) Field of Search .................. 303/1, 85; 96/147, 96/136, 113; 55/DIG. 17; 137/899.4; 220/562, 23.83; 34/80

(56) References Cited

U.S. PATENT DOCUMENTS

| | | | |
|---|---|---|---|
| 3,869,000 A | | 3/1975 | English |
| 3,977,703 A | | 8/1976 | Curtis |
| 5,522,150 A | * | 6/1996 | Schultz ........................... 34/80 |
| 6,074,462 A | | 6/2000 | Quinn et al. |
| 6,082,408 A | * | 7/2000 | Werling et al. .......... 137/899.4 |
| 2002/0189456 A1 | * | 12/2002 | Hoffman et al. .............. 96/110 |

* cited by examiner

Primary Examiner—Douglas C. Butler
(74) Attorney, Agent, or Firm—Jeffrey P. Calfa; Dennis Kelly Sullivan; Susan L. Lukasik

(57) ABSTRACT

An air supply system for a large vehicle air brake system includes an air compressor for supplying compressed air. The compressed or pressurized air is routed to an air dryer which includes a desiccant bed through which the compressed air flows for drying. The air dryer is located between a wet tank and a dry tank for the air supply system and air moves from the dryer to the wet tank. From the wet tank the air passes through a conduit through the air dryer to the dry tank. The air dryer is mounted on tracks allowing it to withdrawn from between the air tanks for replacement or service.

7 Claims, 6 Drawing Sheets

INTEGRATED AIR DRYER MODULE FOR VEHICLE AIR BRAKE

BACKGROUND OF THE INVENTION

1. Field of the Invention

The present invention relates to air brakes for motor vehicles and trailers, and more particularly relates to the air supply system for such brakes.

2. Description of the Problem

Mechanical braking systems for heavy trucks have been largely displaced by more reliable air and hydraulic brakes. Air brakes, requiring no hydraulic liquid, are clean and have fewer environmental concerns should a coupling fail than hydraulic units and have proven popular. An air brake system usually includes a compressor, two air storage tanks, various control valves and air lines. Pressure regulating systems control the compressor. Conduits and valves control application of air pressure to pneumatically driven components. The compressor draws air from the atmosphere and delivers it to one of the tanks which functions as a first stage tank often called the wet tank. From the wet tank the air passes to a second stage tank often called the dry tank from which the air is distributed.

Air brakes can be vulnerable to moisture and because the source of air for the compressed air system is the ambient atmosphere, which may hold much moisture, an air drying system is usually provided between the compressor and the wet tank. Obviously, this air drying system should be highly reliable. At the same time, the air drying system should not complicate assembly or maintenance of a vehicle and it should not be excessively expensive.

Contemporary practice favors desiccant based air drying systems. A desiccant based air dryer provides a molecular sieve through which air passes. The molecular sieve comprises a hydrophillic compound which pulls the moisture from the air. Over time the molecular sieve can break down from repeated cycles of wetting and drying, or from contamination from other impurities. Periodic replacement of the desiccant may be required.

Desiccants have been provided in replaceable, spin-on canisters similar to those used for replaceable oil or fuel filters. The hydrophillic material is located in an outer chamber so that inlet air from the compressor enters the outer chamber, passes through the hydrophillic material, and then passes to the outlet via an inner core. While spin-on canisters are readily replaceable, the amount of water they can remove is dependent upon the length of the flowpath through the desiccant. The space in the canisters is limited and they often cannot be readily lengthened to improve air drying.

The addition of canisters to the air brake system has also added to the complexity of an already complicated pneumatic plumbing system. U.S. Pat. No. 6,074,462 to Quinn is directed to the problem. Numerous air lines have been required to connect the pressure tanks to the brake and other components. Air lines are provided interconnecting the tanks. The tanks have often been located, spaced from one another, wherever room was available on the vehicle frame. The desiccant canister and compressor have also required air lines. Simplification of the entire system, consistent with providing effective and easily maintained air drying would be advantageous.

SUMMARY OF THE INVENTION

According to the invention there is provided a vehicle having an air supply system for a vehicle brake system. The air supply system is based on a compressor for supplying compressed air. The compressed or pressurized air is routed to an air dryer which includes a desiccant bed through which the compressed air flows. The desiccant bed is housed in an outer canister having opposite facing mating sides and a flow through pipe through the bed connecting the opposite facing mating sides. A first stage air tank, located along a first of the opposite facing mating sides, receives air from the air dryer through a port. A second stage air tank is located along the remaining one of the mating sides and communicates with the first stage air tank through the flow through pipe. The air dryer is mounted on tracks allowing it to withdrawn from between the air tanks for replacement or service.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
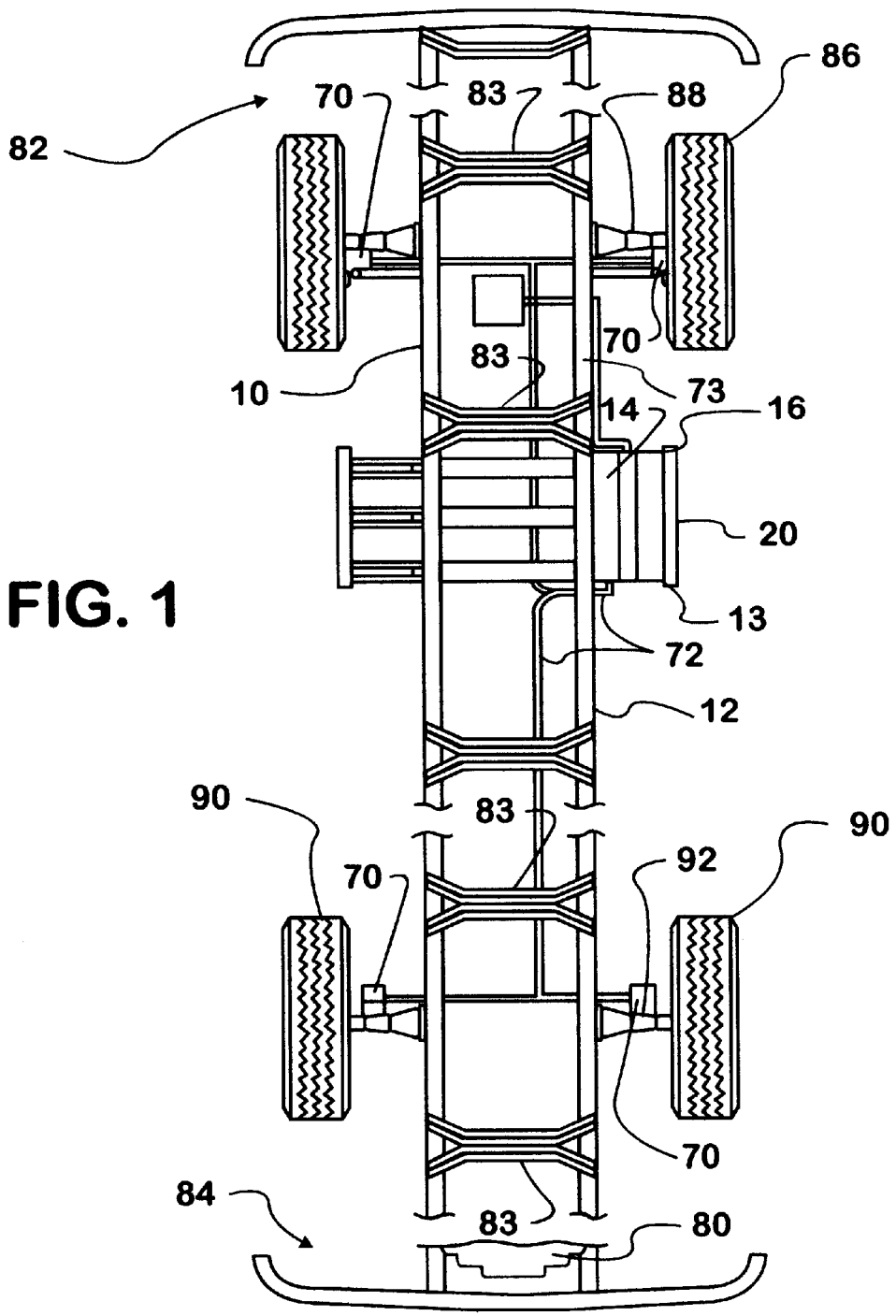
FIG. 1 is a top plan view of a vehicle chassis with an installed air brake system.

Referring now to the figures and in particular to FIG. 1 there is illustrated a vehicle chassis 80 for a vehicle equipped with air actuated, pneumatic brakes 92. Chassis 80 comprises a pair of parallel, longitudinally extending frame rails 10 and 12 which extend from the front end 82 of the vehicle to the rear end 84. Frame rails 10 and 12 are connected to one another by a plurality of cross members 83. Front steerable wheels 86 are carried on a front axle 88 while rear drive wheels 90 are carried on a rear axle 92.

Vehicle chassis 80 is equipped with air brakes 70 associated with front steerable wheels 86 and rear drive wheels 90. Air brakes 70 are pneumatically actuated by application of pressurized air through an air line 72. Air is supplied to air line 72 from reservoir tanks 13 and 14 and a compressor 18 installed on the vehicle.

An accessory support platform 20 hangs from side rails 10 and 12 between the front axle 88 and rear axle 92. Accessory support platform 20 provides support to two compressed air tanks 13 and 14 and an air dryer unit 16 positioned between the air tanks. Accessory support platform 20 comprises three support rails 22, 24 and 26, which are mounted below the frame rails 10 and 12, parallel to one another and perpendicular to the frame rails. Support rails 22, 24 and 26 are substantially longer than the spacing between frame rails 10 and 12, with the result that the support rails extend out from the frame rails toward the sides of the vehicle and can be used to provide a substantial area of support between the frame rails and toward the outside edges of the vehicle. An air line 73 is connected from compressor 18 to air dryer 16. Air line 72 is connected to one of the two air tanks, commonly referred to as a dry tank 14. Air tanks 13 and 14 are permanently mounted to chassis 80. Air dryer module 16 may be withdrawn from between the air tanks 13 and 14 for replacement or service.

Figure 2:
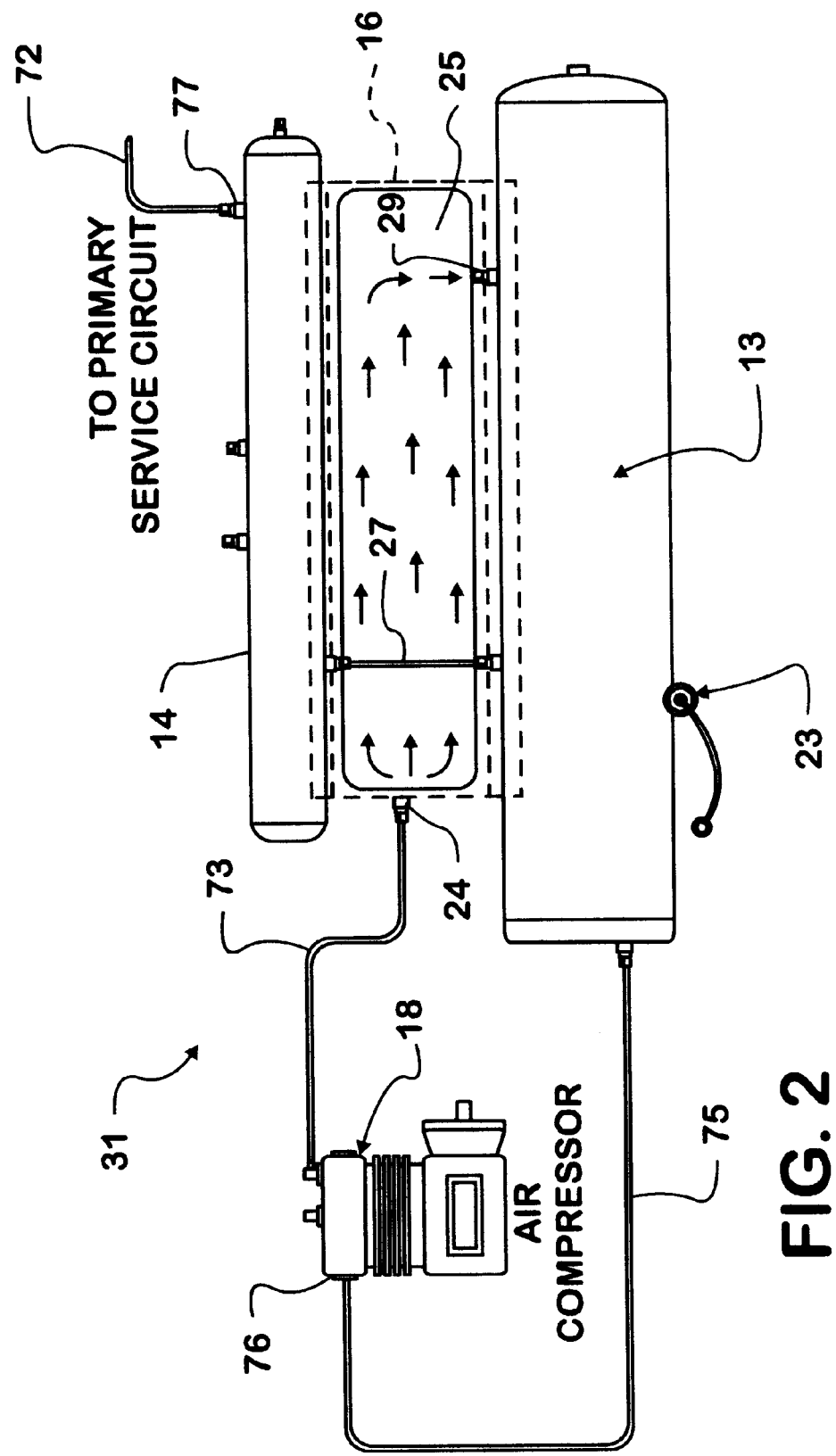
FIG. 2 is a schematic diagram of an air charging system utilizing the present invention.

FIG. 2 shows an air charging system 31 with an air dryer module 16 according to the present invention. Air charging system 31 is based on an air compressor 18 which draws air from the ambient atmosphere. Compressed air is discharged from the pump to an air line 73 which conveys the air to an air dryer module 16 (denoted in phantom) disposed between a wet tank 13 and a dry tank 14. Air passes from air line 73 into air dryer module 16 by a one way check valve 24, passes through a desiccant bed 25 until escaping from the module into wet tank 13 by an outlet 29. Air passes from wet tank 13 to dry tank 14 by a conduit 27 through the air dryer module which aligns with openings into the two tanks when module 16 is positioned between the tanks. An air line 75 applies air pressure from wet tank 13 to a control port inlet 76 on air compressor 18 so that when the air pressure in tank 13 is above a minimum, the load is removed from compressor 18. Dry tank 14 has an outlet to the primary brake service circuit provided by air line 72. A hand actuated water drain may be provided on the exterior of wet tank 13. Air passes through substantially the full length of air dryer 16 which is advantageous for drying.

Exterior sides of air dryer module 16 are shaped to conform to the exterior shapes of the tanks and adapted to form an air tight seal against the adjacent air tanks 13 and 14. Air dryer module 16 itself may be temporarily withdrawn from between tanks 13 and 14 for servicing or convenient replacement of the desiccant bed 25.

Figure 3:
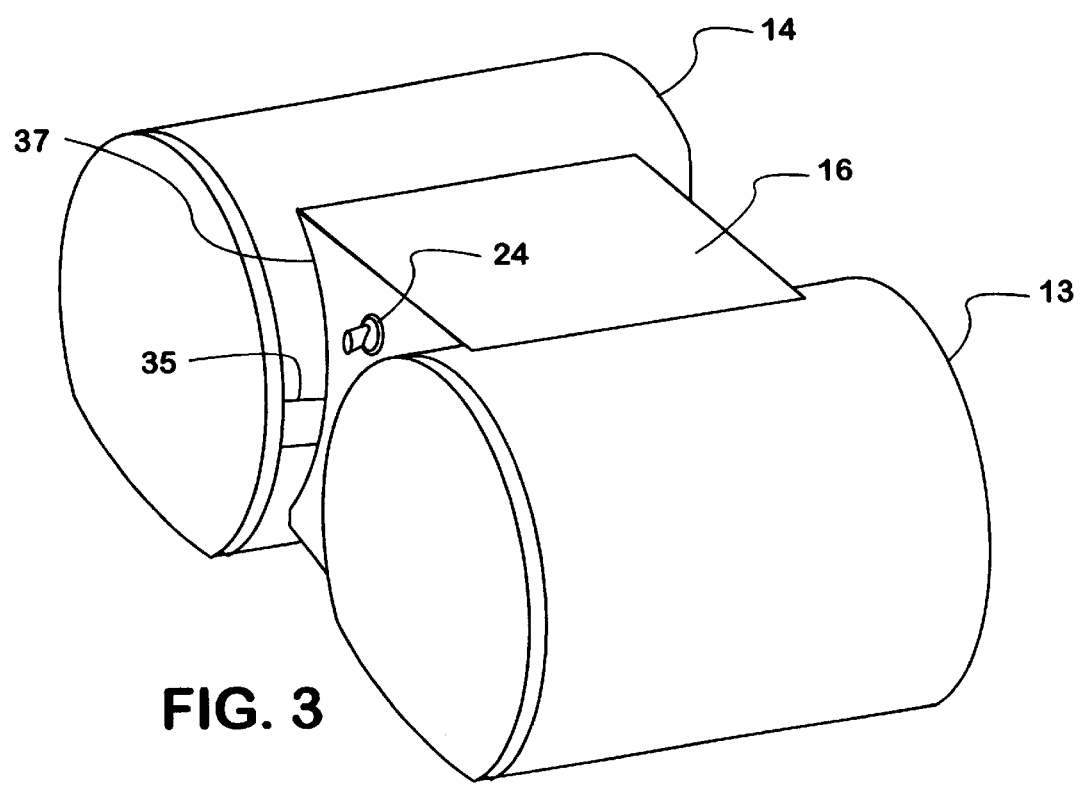
FIG. 3 is a perspective view of the air dryer and tanks assembly.

Referring to FIG. 3 a concave side 37 of dryer module 16 adjacent the cylindrical exterior of dry tank 14. The seal between tank 14 and module 16 is formed in part by a engagement track 35 provided on the exterior of tank 14.

Figure 4:
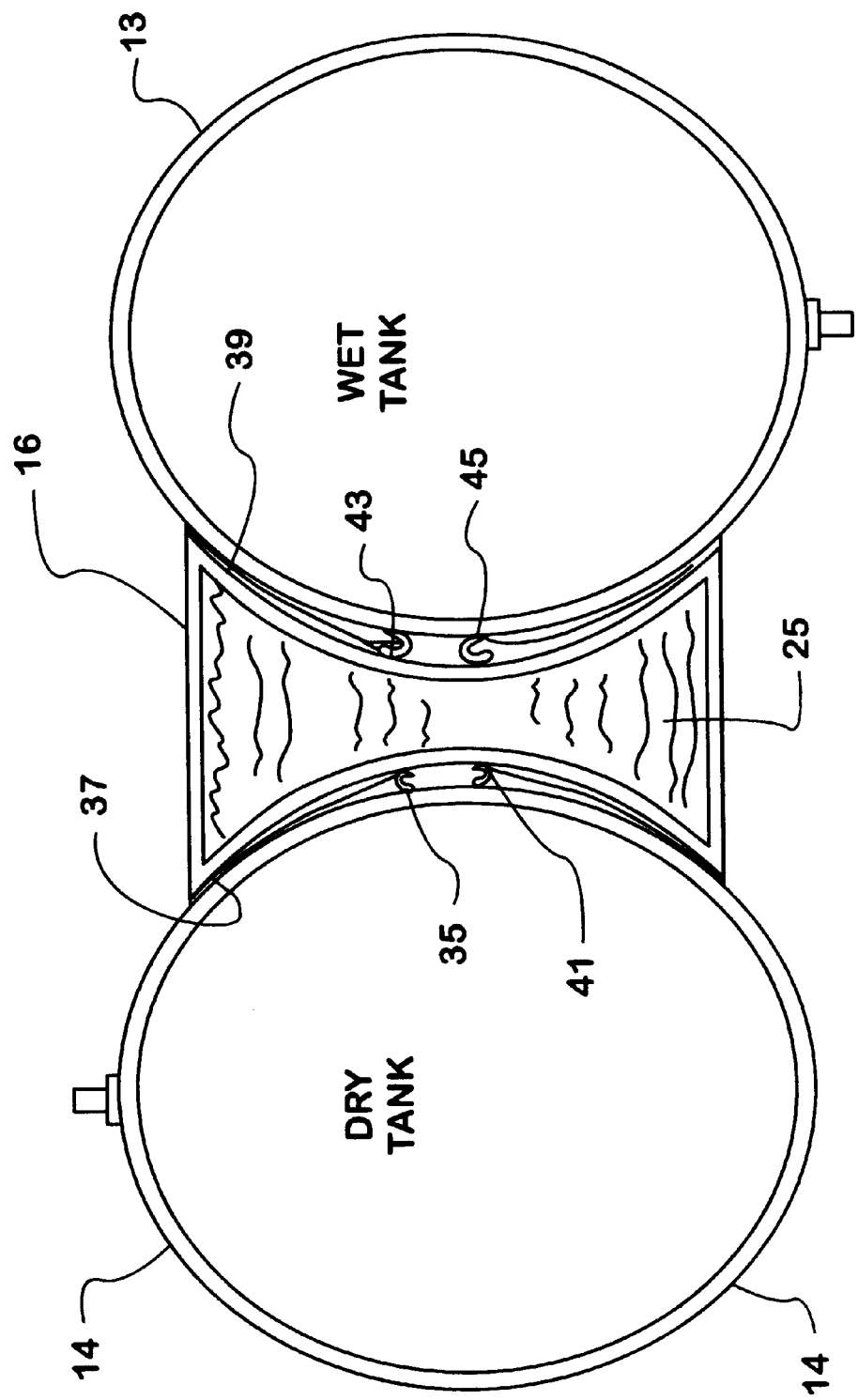
FIG. 4 is a cross sectional view of the air dryer and tanks assembly.
Figure 5:
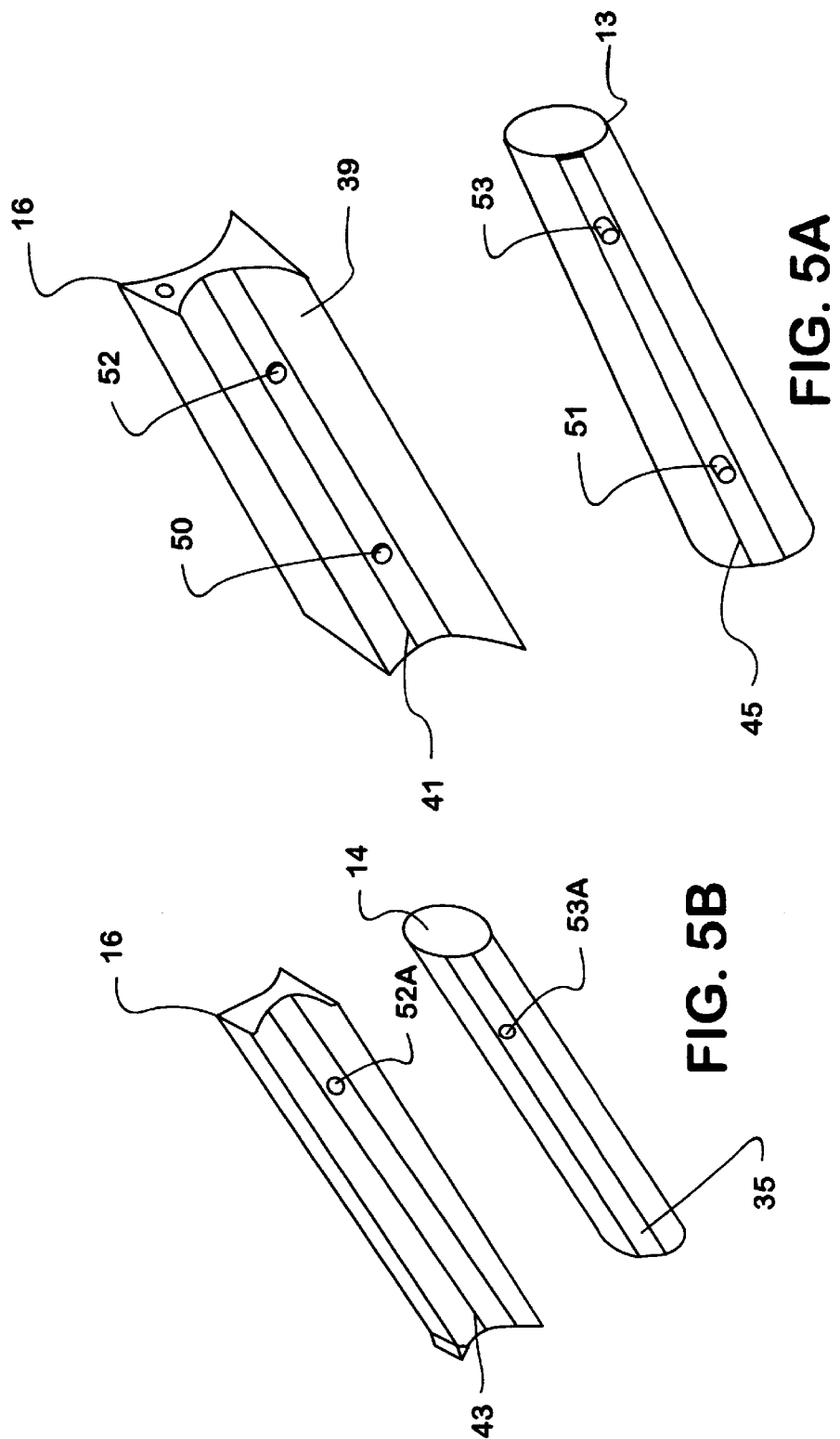
FIGS. 5A and 5B are perspective, disassembled views of components of the air dryer and tanks assembly.

In FIGS. 4 and 5 tanks 13 and 14 are viewed in cross section with air dryer module 16. Air dryer module 16 has outwardly facing elongated concave sides 37 and 39, which are contoured to fit around the cylindrical dry and wet tanks 14 and 13, respectively. Mounted to the outsides of tanks 13 and 14, facing air dryer module 16, are tracks 35 and 45, respectively. Tracks 35 and 45 are elongated in a direction parallel to the central axes of tanks 13 and 14, and centered with respect to the concave faces 37 and 39 of the air dryer module to cooperate with complementary tracks 41 and 43, which are positioned facing outwardly within the concave faces. Each set of tracks comprises two rails, each of which cooperates with its opposite number from a complementary track to retain the tracks in a tight fit against one another. This can be implemented in a number of ways, for example, by two C channels which engage one another around one leg thereof, by making one rail somewhat larger than the other allowing it to be fitted around the smaller channel, or by making the rails of one track spaced rubber flanges, each of which is similar to the anchor for a windshield washer blade and making the rails of the second track channels for receiving the flanges.

FIGS. 5A–5B illustrate that tracks 35, 41, 43 and 45 extend the length of the tanks 13 and 14 and air dryer module 16. Between the rails of the tracks 41 and 45 are ports, including ports 50 and 52 into air dryer module 16 and ports 51 and 53 in wet tank 13. Port 51 aligns with port 50, which is an outlet from the air dryer module and port 53 of wet tank 14 aligns with port 53, which is an entry to conduit 27 which passes through air dryer module. Dry tank 14 and its track 35 have a port 53A corresponding to port 53 of the wet tank 13 to align with conduit 27. There are no direct connections between the interior of air dryer module 16 and dry tank 14.

Figure 6:
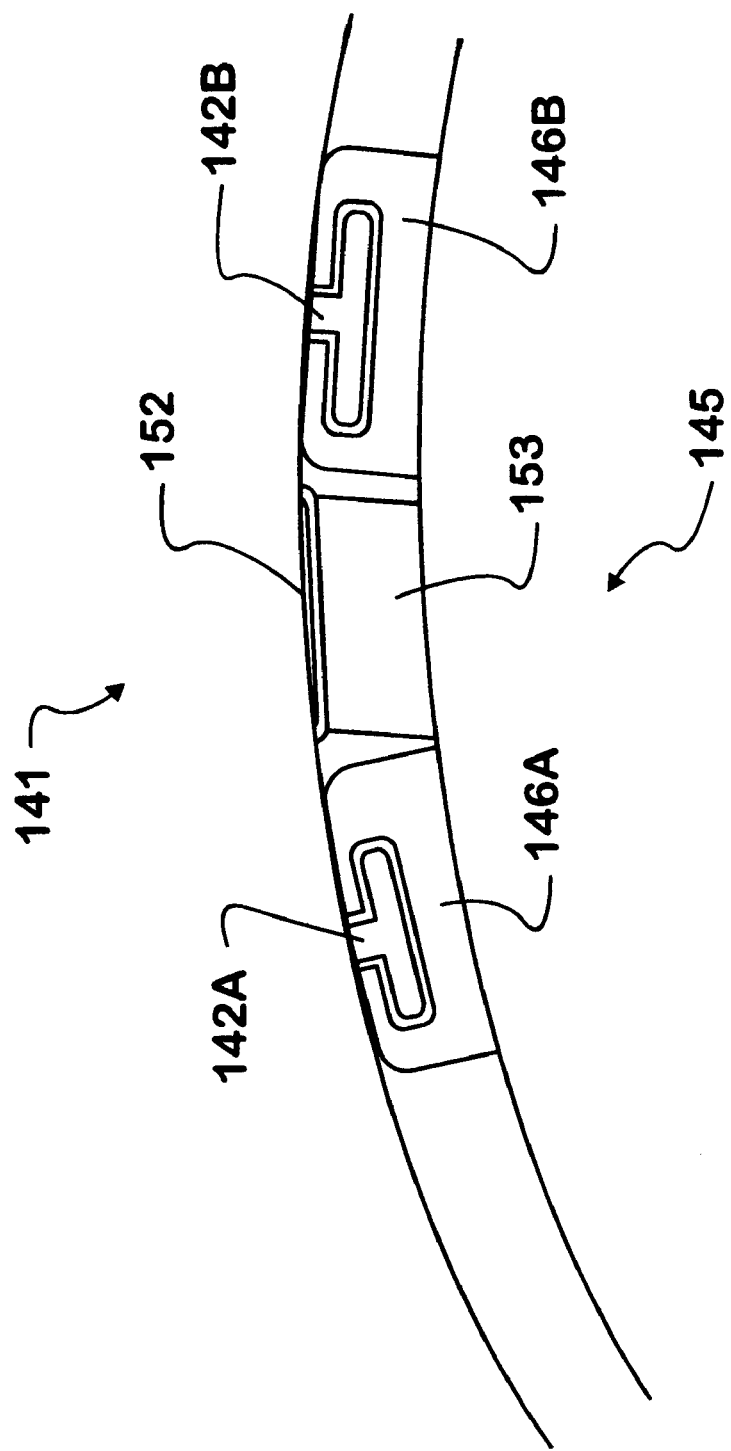
FIG. 6 is a cross sectional view of a port to port connection between the air dryer module and a tank.

The tracks for retaining the air dryer module can be constructed in a number of ways, with FIG. 6 illustrates just one of many possible complementary track arrangements. In FIG. 6 track 141 comprises two rails 142A and B, which have a flattened T cross sectional shape. Rails 142A and B nest in rails 146A and B, respectively, of track 145. Rails 146A and B are blocks with T-shaped slots for receiving the complementary rails. Port 153 extends upwardly between rails 146A and 146B to be impressed and seal against port 152 to provide a substantially air tight conduit. Rails and ports are made of a resilient material such as rubber.

The invention provides an air dryer module for an air driven brake system on a vehicle which simplifies both construction and maintenance of the brake system.

While the invention is shown in only one of its forms, it is not thus limited but is susceptible to various changes and modifications without departing from the spirit and scope of the invention.

What is claimed is:

1. An air supply system for a vehicle brake system comprising:
   a compressor for supplying compressed air;
   an air dryer connected to receive compressed air from the compressor including a desiccant bed through which the compressed air flows and an outer canister having opposite facing mating sides and containing the desiccant bed;
   a first stage air tank for receiving air from the air dryer located along a first of the opposite facing mating sides; and
   a second stage air tank located along the remaining one of the mating sides, the second stage air tank being coupled to communicate with the first stage air tank.

2. An air supply system as set forth in claim 1, the air dryer further comprising:
   a flow through pipe from one side of the air dryer to another through which the second stage air tank communicates with the first stage air tank.

3. An air supply system as set forth in claim 2, further comprising:

releasable connections between the first and second stage tanks and the air dryer allowing the air dryer to be readily removed.

4. A motor vehicle comprising:

a chassis;

a plurality of air brakes depending from the chassis;

an air compressor;

a first stage compressed air tank supported on the chassis;

a second stage compressed air tank supported on the chassis substantially alongside the first stage tank;

an pneumatic circuit connecting the second stage compressed air tank to the plurality of air brakes;

an air dryer module located between the first stage and the second stage, connected by an air line to the air compressor to receive compressed air therefrom;

the air dryer module discharging air directly to the first stage compressed air tank; and a conduit connection through the air dryer module connecting the first stage compressed air tank to the second stage compressed air tank.

5. A motor vehicle as set forth in claim 4, further comprising:

cooperating mounting rails between the first stage compressed air tank and the air dryer module and further cooperating mounting rails between the second stage compressed air tank and the air dryer module allowing the air dryer module to be readily removed and replaced.

6. A motor vehicle as set forth in claim 5, further comprising:

ports on the air dryer module, the first stage compressed air tank, and the second stage compressed air tank aligned by positioning of the air dryer module on the tanks to define air connections from the air dryer to the first stage tank and from the first stage tank to the second stage tank.

7. A motor vehicle as forth in claim 6, wherein the conduit connection is a pipe connecting one exterior side of the air dryer module to an opposite exterior side of the air dryer module.

* * * * *